US012712285B2

(12) United States Patent
Li et al.

(10) Patent No.: US 12,712,285 B2
(45) Date of Patent: Aug. 18, 2026

(54) ANTENNA ASSEMBLY AND MANUFACTURING METHOD THEREOF, ARRAY ANTENNA AND MANUFACTURING METHOD THEREOF, AND COMMUNICATION DEVICE

(71) Applicant: HUAWEI TECHNOLOGIES CO., LTD., Shenzhen (CN)

(72) Inventors: Xiaolai Li, Shanghai (CN); Guanxi Zhang, Shanghai (CN); Long Shen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/823,298

(22) Filed: Sep. 3, 2024

(65) Prior Publication Data

US 2024/0421500 A1 Dec. 19, 2024

Related U.S. Application Data

(63) Continuation of application No. PCT/CN2023/079513, filed on Mar. 3, 2023.

(30) Foreign Application Priority Data

Mar. 4, 2022 (CN) ......................... 202210210941.2

(51) Int. Cl.
*H01Q 21/06* (2006.01)
*H01Q 19/00* (2006.01)

(52) U.S. Cl.
CPC ......... *H01Q 21/065* (2013.01); *H01Q 19/005* (2013.01)

(58) Field of Classification Search
CPC .. H01Q 21/065; H01Q 19/005; H01Q 9/0414; H01Q 1/246; H01Q 1/523;
(Continued)

(56) References Cited

U.S. PATENT DOCUMENTS 3,681,769 A * 8/1972 Perrotti ................ H01Q 21/062 343/822
2014/0168003 A1* 6/2014 Lindalv ................ H01Q 21/062 342/107
(Continued)

FOREIGN PATENT DOCUMENTS

CN 203192944 U 9/2013
CN 106099352 A 11/2016
(Continued)

*Primary Examiner* — Regis J Betsch
*Assistant Examiner* — Jose A. Miranda Gonzalez
(74) *Attorney, Agent, or Firm* — Rimon PC

(57) ABSTRACT

This application relates to the field of antenna technologies, and in particular, to an antenna assembly in which high isolation of the assembly can be achieved. An antenna assembly includes a first antenna array element, a second antenna array element, and a filtering structure. The first antenna array element supports receiving in a first frequency band, and the second antenna array element supports transmitting in a second frequency band. The filtering structure includes at least one of a first filtering structure or a second filtering structure. The first filtering structure is disposed on the first antenna array element, and the second filtering structure is disposed on the second antenna array element.

20 Claims, 6 Drawing Sheets

(58) Field of Classification Search
CPC ........ H01Q 1/525; H01Q 21/26; H01Q 21/28; H01Q 9/0485; H01Q 5/42; H01Q 1/2258; H01Q 1/2291; H01Q 1/242; H01Q 1/32; H01Q 1/48; H01Q 21/0087; H01Q 21/061; H01Q 21/062
See application file for complete search history.

(56) References Cited

U.S. PATENT DOCUMENTS

| | | | | |
|---|---|---|---|---|
| 2017/0222333 | A1* | 8/2017 | Sudo | H01Q 21/24 |
| 2018/0323513 | A1* | 11/2018 | Varnoosfaderani | H01Q 21/062 |
| 2019/0165466 | A1* | 5/2019 | Xu | H01Q 15/0006 |
| 2019/0319352 | A1* | 10/2019 | Gonzalez | H01Q 1/521 |
| 2019/0393729 | A1* | 12/2019 | Contopanagos | H02J 50/40 |
| 2020/0186180 | A1* | 6/2020 | Park | H01Q 5/307 |
| 2021/0151890 | A1* | 5/2021 | Zhang | H01Q 9/16 |
| 2021/0167804 | A1 | 6/2021 | Xiao et al. | |
| 2021/0242607 | A1* | 8/2021 | Otten | H01Q 1/2283 |
| 2023/0006364 | A1* | 1/2023 | Park | H01Q 21/24 |
| 2023/0327338 | A1* | 10/2023 | Minamitani | H01Q 21/28 343/727 |
| 2023/0411869 | A1* | 12/2023 | Jang | H01Q 5/378 |
| 2024/0036184 | A1* | 2/2024 | Iwasa | H01Q 21/293 |
| 2025/0141120 | A1* | 5/2025 | Wu | H01Q 15/14 |
| 2025/0286281 | A1* | 9/2025 | Jargalsaikhan | H01Q 15/14 |

FOREIGN PATENT DOCUMENTS

| | | | | |
|---|---|---|---|---|
| CN | 107230829 | A | 10/2017 | |
| CN | 109509963 | A | 3/2019 | |
| CN | 209282382 | U | 8/2019 | |
| CN | 111029756 | A | 4/2020 | |
| CN | 112787080 | A * | 5/2021 | H01Q 1/38 |
| CN | 112821044 | A | 5/2021 | |
| EP | 2963736 | A1 * | 1/2016 | H01Q 9/26 |

* cited by examiner

ANTENNA ASSEMBLY AND MANUFACTURING METHOD THEREOF, ARRAY ANTENNA AND MANUFACTURING METHOD THEREOF, AND COMMUNICATION DEVICE

CROSS-REFERENCE TO RELATED APPLICATIONS

This application is a continuation of International Application No. PCT/CN2023/079513, filed on Mar. 3, 2023, which claims priority to Chinese Patent Application No. 202210210941.2, filed on Mar. 4, 2022. The aforementioned applications are hereby incorporated by reference in their entireties.

TECHNICAL FIELD

This application relates to the field of antenna technologies, and in particular, to an antenna assembly and a manufacturing method thereof, an array antenna and a manufacturing method thereof, and a communication device.

BACKGROUND

With the advancement of wireless communication systems, a wireless communication system imposes increasingly high requirements on antennas. For example, the quantity of antenna channels needs to increase. However, as the quantity of antenna channels is increased, an overall size of the antenna is also increased. A current wireless communication system also has a high requirement on miniaturization. Therefore, how to implement more antenna channels in a limited space becomes an urgent problem to be resolved.

SUMMARY

This application provides an antenna assembly in which isolation of the antenna assembly is high. When a plurality of antenna assemblies are distributed in an array, the spacing between two adjacent antenna assemblies is reduced, thereby reducing the size of the entire array antenna.

According to a first aspect, this application provides an antenna assembly. The antenna assembly includes a first antenna array element, a second antenna array element, and a filtering structure. The first antenna array element may support receiving in a first frequency band, and the second antenna array element may support transmitting in a second frequency band. The filtering structure may include at least one of a first filtering structure or a second filtering structure. The first filtering structure may be disposed on the first antenna array element, and the second filtering structure may be disposed on the second antenna array element. Specifically, the first antenna array element and the second antenna array element may respectively receive a signal in the first frequency band and transmit a signal in the second frequency band. The first filtering structure may perform filtering in a non-operating frequency band of the first antenna array element, to avoid crosstalk with the second antenna array element caused by the non-operating frequency band of the first antenna array element. The second filtering structure may perform filtering in a non-operating frequency band of the second antenna array element, to avoid crosstalk with the first antenna array element caused by the non-operating frequency band of the second antenna array element. In this way, the performance of the antenna assembly can be improved, space occupied by the antenna assembly can be reduced, and receive-transmit isolation of the antenna assembly can be further increased, so that when a plurality of antenna assemblies are disposed on a metal floor, a smaller spacing between two adjacent antenna assemblies may be set, and space occupied by an entire array antenna is smaller, to implement miniaturization of the antenna.

The first antenna array element may support receiving in the first frequency band, and the first frequency band may be specifically but is not limited to 1.71 GHz to 1.785 GHZ, 1.92 GHz to 1.98 GHz, 1.4279 GHz to 1.4479 GHz, or 2.5 GHz to 2.57 GHz.

Optionally, the first antenna array element is a single-band receiving antenna. For example, if the first frequency band is 1.71 GHz to 1.785 GHz, an operating frequency band of the first antenna array element is 1.71 GHz to 1.785 GHz, and a frequency band other than the first frequency band may be referred to as a non-operating frequency band of the first antenna array element.

Optionally, when the first antenna array element is a dual-band receiving antenna, for example, specific dual frequency bands are 1.71 GHz to 1.785 GHz and 1.92 GHz to 1.98 GHz, the non-operating frequency band of the first antenna array element is a frequency band other than the frequency bands of 1.71 GHz to 1.785 GHz and 1.92 GHz to 1.98 GHz.

The second antenna array element may support receiving in the second frequency band, and the second frequency band may be specifically but is not limited to 1.805 GHz to 1.88 GHZ, 2.11 GHz to 2.17 GHz, 1.4759 GHz to 1.4959 GHz, or 2.62 GHz to 2.69 GHz.

Optionally, the second antenna array element is a single-band transmitting antenna. For example, if the second frequency band is 1.805 GHz to 1.88 GHZ, an operating frequency band of the second antenna array element is 1.805 GHz to 1.88 GHz, and a frequency band other than the second frequency band may be referred to as a non-operating frequency band of the second antenna array element.

Optionally, the second antenna array element may alternatively be a dual-band transmitting antenna. For example, specific dual frequency bands are 1.805 GHz to 1.88 GHz and 2.11 GHz to 2.17 GHz. The non-operating frequency band of the second antenna array element is a frequency band other than the frequency bands of 1.805 GHz to 1.88 GHz and 2.11 GHz to 2.17 GHz.

It should be noted that, the first antenna array element may alternatively be a triple-band antenna, and/or the second antenna array element may alternatively be a triple-band antenna.

In a possible embodiment, the first antenna array element further has a transmitting function, in other words, the first antenna array element may further support transmitting in a third frequency band. In this way, the first antenna array element may have both a receiving function and a transmitting function.

In a possible embodiment, to make the size of each antenna assembly smaller, the axial distance between the first antenna array element and the second antenna array element may be smaller. For example, the axial distance between the first antenna array element and the second antenna array element is less than 0.3 wavelength. Optionally, the first antenna array element and the second antenna array element may be disposed coaxially.

In a possible embodiment of the foregoing embodiment, a coverage area of the first antenna array element and a coverage area of the second antenna array element partially or completely overlap, and a gap exists between the axis of the first antenna array element and the axis of the second antenna array element. In this way, the size of the antenna assembly may also be reduced.

In a possible embodiment of the foregoing embodiment, the first antenna array element may be specifically any one of the following: a dipole antenna, a dielectric resonator antenna, or a patch antenna, and the second antenna array element may also be any one of the following: a dipole antenna, a dielectric resonator antenna, or a patch antenna.

In a possible embodiment of the foregoing embodiment, the first filtering structure may include a split-ring resonator structure, the first antenna array element may be a dipole antenna, the dipole antenna may include a first feeding unit and one or more dipole arms coupled to the first feeding unit, at least one split-ring resonator structure may be disposed on at least one of the one or more dipole arms, and a slit of the split-ring resonator structure faces the axis of the dipole antenna. Optionally, the dipole antenna may include one dipole arm and one feeding unit, and one split-ring resonator structure may be disposed on one dipole arm, or two split-ring resonator structures may be disposed on one dipole arm. In this case, the dipole antenna is a single-polarized antenna, and one split-ring resonator structure may perform filtering in one non-operating frequency band of the first antenna array element. Optionally, the quantity of split-ring resonator structures on the dipole arm may be set based on a filtering requirement of the dipole antenna. The split-ring resonator structure may enable the dipole antenna to have high impedance in the non-operating frequency band, and destroy the original impedance matching of the dipole arm of the dipole antenna, to implement a stopband characteristic. Therefore, the split-ring resonator may perform filtering in the non-operating frequency band of the first antenna array element.

Optionally, the dipole antenna includes two dipole arms, the two dipole arms are on the same plane, and each dipole arm may be coupled to one first feeding unit. One or more split-ring resonator structures may be disposed on each dipole arm. For example, two split-ring resonator structures may be disposed on each dipole arm. In other words, at least two split-ring resonator structures may be disposed on the two dipole arms, and a slit of at least one of the at least two split-ring resonator structures faces the axis of the dipole antenna. For example, slits of all the split-ring resonator structures face the axis of the dipole antenna. In this configuration, the dipole antenna may be a dual-polarized antenna. At least two of all the split-ring resonator structures on the dipole arms may perform filtering in different non-operating frequency bands of the first antenna array element. For example, all the split-ring resonator structures perform filtering in different non-operating frequency bands of the first antenna array element. It may be understood that even if filtering in different non-operating frequency bands are performed, filtering ranges corresponding to the split-ring resonator structures may partially overlap or may not overlap at all.

Optionally, the split-ring resonator structure is a ¼ wavelength split-ring resonator structure. In this way, the split-ring resonator structure has a high quality factor characteristic, and may further implement high selectivity of a stopband frequency band.

In a possible implementation of the foregoing embodiment, the first filtering structure may include a first coupled resonator structure. The first coupled resonator structure may be disposed on the first feeding unit of the dipole antenna. The first coupled resonator structure may also enable the non-operating frequency band of the dipole antenna to implement the stopband characteristic, to filter the non-operating frequency band of the dipole antenna. Optionally, the first coupled resonator structure and the split-ring resonator structure may filter different frequency bands or the same frequency band.

In this way, the first filtering structure may filter different frequency bands or the same non-operating frequency band of the first antenna array element by using the first coupled resonator structure and/or the split-ring resonator structure. When the first coupled resonator structure and the split-ring resonator structure filter the same frequency band, an effect of filtering the frequency band by the first filtering structure can be better. When the first coupled resonator structure and the split-ring resonator filter different frequency bands, the first filtering structure can perform filtering in more non-operating frequency bands.

Optionally, the first feeding unit may include a feeding balun, a feeder, a ground end, and a first dielectric plate. The first dielectric plate may be configured to support the dipole arm, so that the position of the dipole arm is fixed. The feeder and the ground end may be disposed on two opposite surfaces of the first dielectric plate, one end of the feeder may be connected to the feeding balun, the feeding balun may be coupled to the dipole arm, and the other end of the feeder may be connected to a power division network. In addition, when the first coupled resonator structure is specifically disposed, the first coupling resonator may be disposed on the first dielectric plate, the first coupled resonator structure and the feeder are on the same side, and a gap exists between the first coupled resonator structure and the feeder. For example, the gap may be but is not limited to 0.2 mm. Alternatively, a plurality of first coupled resonator structures may be disposed, at least two of the plurality of first coupled resonator structures may perform filtering in different frequency bands. In addition, a cross section of the first coupled resonator structure may be set to be a rectangle, and a slit of the first coupled resonant structure may be provided on any side wall of the rectangle, to improve a filtering effect of the first coupled resonator structure.

In a possible embodiment of the foregoing embodiment, the second filtering structure may include a short-circuit cavity, and the short-circuit cavity may be disposed on the second antenna array element, to perform filtering in the non-operating frequency band of the second antenna array element, to avoid crosstalk with the first antenna array element caused by a signal in the non-operating frequency band of the second antenna array element.

Optionally, the second antenna array element may be a patch antenna. Optionally, the patch antenna may include an antenna body, a parasitic patch, and a second feeding unit. The second feeding unit may be connected to the antenna body and a power division network. It may be understood that the connections in this application are all electrical connections, in other words, signal transmission exists. The connection may be a direct connection or an indirect connection via another component element. This is not limited herein. Optionally, the parasitic patch may be disposed between the antenna body and the dipole antenna, and a gap exists between the parasitic patch and the antenna body, to increase a bandwidth of the patch antenna. Optionally, the short-circuit cavity may be disposed on a side that is of the parasitic patch and that is away from the dipole antenna, to improve the filtering effect of the short-circuit cavity. In addition, optionally, holes may be provided on the parasitic patch and the antenna body. The holes may facilitate an electrical connection between the ground end of the first feeding unit in the first antenna array element and a ground end of the second feeding unit, so that the patch antenna and the dipole antenna can be co-grounded, to ensure that the first filtering structure and the second filtering structure can perform filtering in the patch antenna and the dipole antenna.

Optionally, when an opening is provided on the parasitic patch, the opening may be but is not limited to a square hole, provided that it is ensured that the opening does not destroy a current in a direction of ±45° on the patch antenna, to avoid the deterioration of cross polarization ratio in directivity patterns. Optionally, to improve a filtering effect of the short-circuit cavity, the short-circuit cavity may be of a cross-shaped structure, for example, a ½ wavelength cross-shaped structure.

In a possible embodiment of the foregoing embodiment, the second filtering structure may include a second coupled resonator structure. Optionally, the second antenna array element may include a second dielectric plate. Both the second coupled resonator structure and the second feeding unit included in the second antenna array element may be disposed on the second dielectric plate, and the second coupled resonator structure is coupled to the second feeding unit, to perform filtering in the non-operating frequency band of the patch antenna, and further improve an effect of filtering the non-operating frequency band by the second antenna array element. Optionally, a gap exists between the second coupled resonator structure and the second feeding unit, so that the second coupled resonant structure is coupled to the second feeding unit, to perform filtering in the non-operating frequency band of the second antenna array element. In this way, the second filtering structure may filter different frequency bands or the same non-operating frequency band of the second antenna array element by using the short-circuit cavity and/or the second coupled resonator structure. When the second coupled resonator structure and the short-circuit cavity filter the same frequency band, the effect of filtering the frequency band by the second filtering structure can be better. When the second coupled resonator structure and the short-circuit cavity filter different frequency bands, the second filtering structure can perform filtering in more non-operating frequency bands.

Optionally, in the foregoing embodiment, the antenna assembly may include a baffle plate, and the baffle plate may be disposed between the patch antenna and the dipole antenna. Specifically, the baffle plate may be disposed between the parasitic patch and the dipole arm. In this way, the problem of distortion in directivity patterns of the antenna assembly can be improved.

According to a second aspect, this application further provides an array antenna. The array antenna includes a plurality of antenna assemblies in any technical solution in the first aspect, the array antenna further includes a metal floor, and the plurality of antenna assemblies are distributed on the metal floor in an array. Because the antenna assembly has high isolation, when the plurality of antenna assemblies are disposed on the metal floor, a smaller spacing between two adjacent antenna assemblies may be set in a row direction, so that space occupied by the entire array antenna is smaller, and miniaturization of the array antenna is implemented.

According to a third aspect, this application further provides a communication device. The communication device has the array antenna in any technical solution in the second aspect. The communication device may be specifically configured as a base station, a Wi-Fi device, a mobile phone, a vehicle-mounted terminal, a tablet, or a computer.

According to a fourth aspect, this application further provides a manufacturing method for an array antenna, including: placing the antenna assembly according to any one of the first aspect or the possible embodiments of the first aspect on the metal floor, where the plurality of antenna assemblies are distributed on the metal floor in an array, to obtain the array antenna according to the second aspect.

According to a fifth aspect, this application further provides a manufacturing method for the antenna assembly according to any one of the first aspect or the possible embodiments of the first aspect. The method includes at least one of the following: disposing the first filtering structure on the first antenna array element, or disposing the second filtering structure on the second antenna array element. For another step, refer to the connection or disposing of each component in the antenna assembly according to any one of the first aspect or the possible embodiments of the first aspect. Details are not described herein again.

REFERENCE NUMERALS

Figure 1:
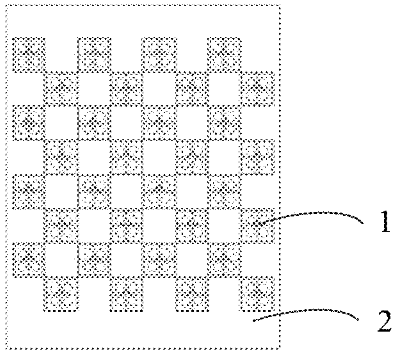
FIG. 1 is a top view of an array antenna according to an embodiment of this application.

1—Antenna assembly; 2—Metal floor; 10—First antenna array element; 11—Dipole arm; 12—First feeding unit; 120—First dielectric plate; 121—Ground end; 122—Feeder; 123—Feeding balun; 20—Second antenna array element; 21—Antenna body; 22—Parasitic patch; 23—Second dielectric plate; 24—Second feeding unit; 30—First filtering structure; 31—Split-ring resonator structure; 40—Second filtering structure; 41—Short-circuit cavity; 50—First coupled resonator structure; 60—Second coupled resonator structure; and 70—Baffle plate.

DESCRIPTION OF EMBODIMENTS

To make the objectives, technical solutions, and advantages of this application clearer, the following further describes this application in detail with reference to the accompanying drawings.

In a frequency division duplex (FDD) communication system, if a receiving antenna and a transmitting antenna are staggered in a vertical direction, isolation between the receiving antenna and the transmitting antenna may be used to reduce requirements of an antenna system on a radio frequency front-end filter and a radio frequency front-end duplexer, so that process requirements of a radio frequency front-end on the filter and the radio frequency front-end duplexer are reduced, thereby improving a yield rate of a product and reducing costs. When the receiving antenna and the transmitting antenna are disposed in a staggered manner in the vertical direction, the receiving antenna and the transmitting antenna are separated. However, to ensure the isolation and directivity pattern performance between the receiving antenna and the transmitting antenna, the receiving antenna and the transmitting antenna cannot be disposed compactly in a horizontal direction. Consequently, the antenna system needs to occupy an excessively large surface size. In the FDD communication system, the receiving antenna and the transmitting antenna may alternatively be made into an antenna integrating transmitting and receiving functions. To place more antenna channels in limited space, antenna elements integrating the transmitting and receiving functions may be closely arranged in the horizontal direction. The surface size of an antenna array can be reduced in this manner. However, for the antenna integrating the transmitting and receiving functions, the requirements of the radio frequency front-end on the duplexer and the filter are increased, and costs are increased.

Therefore, this application provides an antenna assembly, to reduce requirements of a radio frequency front-end on a duplexer and a filter, and further reduce the surface size of an antenna.

To make the objectives, technical solutions, and advantages of this application clearer, the following further describes the antenna assembly provided in this application in detail with reference to the accompanying drawings and specific embodiments.

Terms used in the following embodiments are merely intended to describe specific embodiments, but are not intended to limit this application. The terms "one", "a", "the", "the foregoing", "this", and "the one" in singular forms used in the specification and the appended claims of this application are also intended to include forms such as "one or more", unless otherwise specified in the context clearly.

Reference to "an embodiment", "some embodiments", or the like described in this specification means that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to the same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

This application provides a communication device. The communication device may include an array antenna. Refer to FIG. 1. The array antenna may include a metal floor 2 and a plurality of antenna assemblies 1 disposed on the metal floor 2 in an array distribution manner. Because the antenna assembly 1 has high isolation, when the plurality of antenna assemblies 1 are disposed on the metal floor 2, a smaller spacing (row spacing) between two adjacent antenna assemblies 1 may be set, so that space occupied by the entire array antenna is smaller, miniaturization of the array antenna is implemented, and the size of the communication device can also be reduced. In addition, because the antenna assembly has high isolation, dependence of the array antenna in the communication device on high performance of a filter and a duplexer is reduced, and costs of the entire array antenna and the communication device can be reduced.

It should be noted that, the communication device may be a device that provides a wireless communication function service. The communication device may be located on a network side, and includes but is not limited to a next generation NodeB (gNB) in a 5th generation (5G) communication system, a next generation NodeB in a 6th generation (6G) mobile communication system, a base station in a future mobile communication system, an access node in a Wi-Fi system, an evolved NodeB (eNB) in a long term evolution (LTE) system, a radio network controller (RNC), a NodeB (NB), a base station controller (BSC), a home NodeB (for example, a home evolved NodeB or a home NodeB, HNB), a baseband unit (BBU), a transmission reception point (TRP), a transmission point (TP), a base transceiver station (BTS), and the like. In a network structure, the communication device may include a central unit (CU) node, a distributed unit (DU) node, a radio access network (RAN) device including the CU node and the DU node, or a RAN device including a control plane CU node, a user plane CU node, and the DU node. The communication device serves a cell. User equipment communicates with a base station by using a transmission resource (for example, a frequency domain resource or a spectrum resource) used by the cell. The cell may be a cell corresponding to the base station (for example, a base station). The cell may belong to a macro base station, or belong to a base station corresponding to a small cell. The small cell herein may include a metro cell, a micro cell, a pico cell, a femto cell, or the like. These small cells have features of small coverage and low transmit power, and are applicable to providing a high-rate data transmission service. The communication device may be a macro base station, may be a micro base station or an indoor base station, or may be a relay node or a donor node, a device that provides a wireless communication service for the user equipment and that is in a V2X communication system, a radio controller in a cloud radio access network (CRAN) scenario, a relay station, a vehicle-mounted device, a wearable device, a network device in a future evolved network, or the like. A specific technology and a specific device form used by the communication device are not limited in embodiments of this application.

The communication device may alternatively be a terminal. The terminal may also be referred to as a terminal device, user equipment (UE), a mobile station (MS), a mobile terminal (MT), or the like, and may be an entity, on a user side, configured to receive or transmit a signal, for example, a mobile phone. The terminal device may be user equipment. The UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in autonomous driving, a wireless terminal in telemedicine, a wireless terminal in a smart grid, a wireless terminal in a smart city, a wireless terminal in a smart home, or the like. The terminal may be widely used in various scenarios, for example, device-to-device (D2D), vehicle-to-everything (V2X) communication, machine-type communication (MTC), an internet of things (IoT), virtual reality, augmented reality, industrial control, autonomous driving, telemedicine, a smart grid, smart furniture, a smart office, smart wearable, smart transportation, and a smart city. The terminal may be a mobile phone, a tablet computer, a computer with a wireless transceiver function, a wearable device, a vehicle, an uncrewed aerial vehicle, a helicopter, an airplane, a ship, a robot, a mechanical arm, a smart home device, or the like.

Refer to FIG. 2*a*, FIG. 2*b*, FIG. 2*c*, and FIG. 2*d*. The following describes the antenna assembly in detail. For ease of understanding, first, an antenna array element in this application is an antenna array element, and may also be referred to as an antenna element or an antenna array subunit. In addition, an operating frequency band and a non-operating frequency band of a first antenna array element 10 and an operating frequency band and a non-operating frequency band of a second antenna array element 20 are explained. The first antenna array element 10 may support receiving in a first frequency band. Specifically, the first frequency band may be considered as the operating frequency band of the first antenna array element 10, and a frequency band other than the first frequency band may be considered as the non-operating frequency band of the first antenna array element 10. Similarly, the second antenna array element 20 may support transmitting in a second frequency band. The second frequency band may be considered as the operating frequency band of the second antenna array element 20, and a frequency band other than the second frequency band may be considered as the non-operating frequency band of the second antenna array element 20.

The antenna assembly may include the first antenna array element 10, the second antenna array element 20, and a filtering structure. The filtering structure may include at least one of a first filtering structure 30 or a second filtering structure 40. The first filtering structure 30 may be disposed on the first antenna array element 10, and the second filtering structure 40 may be disposed on the second antenna array element 20. In addition, the first antenna array element 10 may support receiving in the first frequency band, and the second antenna array element 20 may support transmitting in the second frequency band. Specifically, when the first antenna array element 10 receives a signal in the first frequency band, the first filtering structure 30 may perform filtering in the non-operating frequency band of the first antenna array element 10, to avoid crosstalk with the second antenna array element 20 caused by a signal in the non-operating frequency band of the first antenna array element 10. Similarly, when the second antenna array element 20 transmits a signal in the second frequency band, the second filtering structure 40 may perform filtering in the non-operating frequency band of the second antenna array element 20, to avoid crosstalk with the first antenna array element 10 caused by the non-operating frequency band of the second antenna array element 20. In this way, performance of the antenna assembly can be improved, space occupied by the antenna assembly can be reduced, and receive-transmit isolation of the antenna assembly can be further increased, so that when a plurality of antenna assemblies are disposed on a metal floor, a smaller spacing between two adjacent antenna assemblies may be set, and space occupied by an entire antenna is smaller, to implement miniaturization of the antenna.

Specifically, the first frequency band may be but is not limited to one or more frequency bands of 1.71 GHz to 1.785 GHZ, 1.92 GHz to 1.98 GHZ, 1.4279 GHz to 1.4479 GHz, or 2.5 GHz to 2.57 GHz. Specifically, the first antenna array element 10 may be a single-band receiving antenna. For example, if the first frequency band is one of 1.71 GHz to 1.785 GHz, 1.92 GHz to 1.98 GHz, 1.4279 GHz to 1.4479 GHz, or 2.5 GHz to 2.57 GHz, a frequency band other than the frequency band of 1.71 GHz to 1.785 GHZ, 1.92 GHz to 1.98 GHz, 1.4279 GHz to 1.4479 GHz, or 2.5 GHz to 2.57 GHz may be referred to as a non-operating frequency band of the first antenna array element 10.

When the first antenna array element 10 is a dual-band receiving antenna, for example, specific dual frequency bands are 1.71 GHz to 1.785 GHz and 1.92 GHz to 1.98 GHz, the non-operating frequency band of the first antenna array element is a frequency band other than the frequency bands 1.71 GHz to 1.785 GHz and 1.92 GHz to 1.98 GHz.

The second frequency band may be specifically but is not limited to one or more frequency bands of 1.805 GHz to 1.88 GHz, 2.11 GHz to 2.17 GHZ, 1.4759 GHz to 1.4959 GHz, or 2.62 GHz to 2.69 GHz. Specifically, the second antenna array element 20 may be a single-band transmitting antenna. For example, if the second frequency band is 1.805 GHz to 1.88 GHz, the operating frequency band of the second antenna array element 20 is 1.805 GHz to 1.88 GHz, and a frequency band other than the second frequency band may be referred to as a non-operating frequency band of the second antenna array element 20.

The second antenna array element 20 may alternatively be a dual-band transmitting antenna. For example, specific dual frequency bands are 1.805 GHz to 1.88 GHz and 2.11 GHz to 2.17 GHz. The non-operating frequency band of the second antenna array element 20 is a frequency band other than the frequency bands of 1.805 GHz to 1.88 GHz and 2.11 GHz to 2.17 GHz.

In addition, it should be noted that, the first antenna array element 10 may alternatively be a triple-band antenna, and/or the second antenna array element 20 may alternatively be a triple-band antenna.

In a possible embodiment, the first antenna array element 10 may further have a transmitting function, in other words, the first antenna array element 10 may further support transmitting in a third frequency band.

In the foregoing embodiment, the first antenna array element 10 may be but is not limited to any one of the following: a dipole antenna, a dielectric resonator antenna, or a patch antenna, and the second antenna array element 20 may be but is not limited to any one of the following: a dipole antenna, a dielectric resonator antenna, or a patch antenna. When the first antenna array element 10 and the second antenna array element 20 are specifically disposed, to make the size of the antenna assembly 1 smaller, the first antenna array element 10 and the second antenna array element 20 may be disposed coaxially, to reduce space occupied when the first antenna array element 10 and the second antenna array element 20 are disposed.

In a possible embodiment of the foregoing embodiment, a coverage area of the first antenna array element 10 and a coverage area of the second antenna array element 20 may partially or completely overlap, and a gap may exist between the axis of the first antenna array element 10 and the axis of the second antenna array element 20. In this way, the size of the antenna assembly may also be reduced.

Refer to FIG. 2*a* to FIG. 2*d*. It should be noted that, the first antenna array element 10 included in the antenna assembly may be the dipole antenna, and the second antenna array element 20 may be the patch antenna. The first antenna array element 10 included in the antenna assembly may be the dipole antenna, and the second antenna array element 20 may be the dielectric resonator antenna; both the first antenna array element 10 and the second antenna array element 20 included in the antenna assembly may be the dipole antennas; or the first antenna array element 10 included in the antenna assembly may be the dielectric resonator antenna, and the second antenna array element 20 may be the patch antenna.

The following provides more detailed descriptions by using an example in which the first antenna array element is the dipole antenna and the second antenna array element is a patch.

Figure 2A:
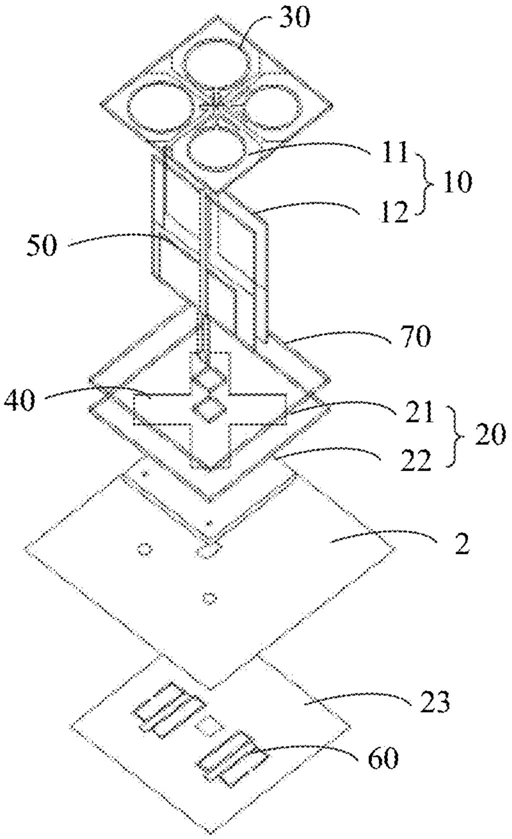
FIG. 2*a* is a diagram of a structure of an antenna assembly according to an embodiment of this application.
Figure 2B:
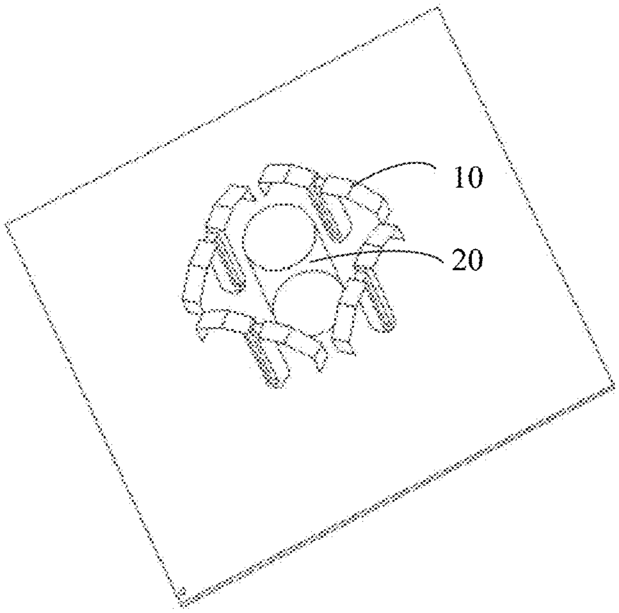
FIG. 2*b* is another diagram of a structure of an antenna assembly according to an embodiment of this application.
Figure 2C:
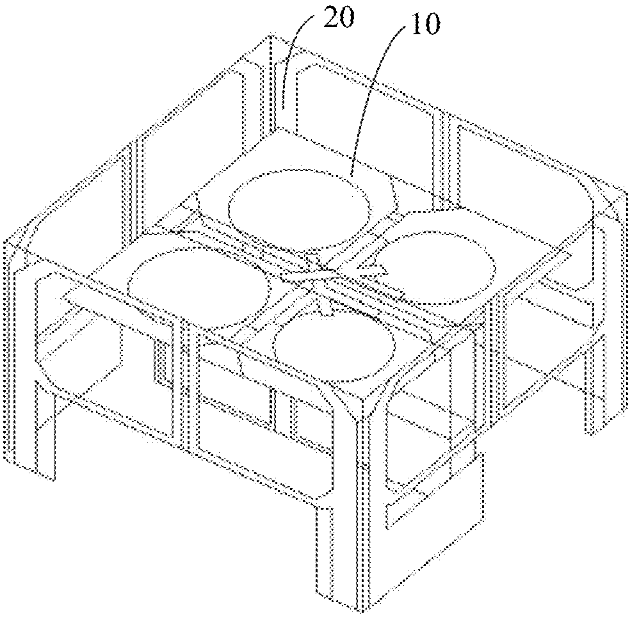
FIG. 2*c* is another diagram of a structure of an antenna assembly according to an embodiment of this application.
Figure 2D:
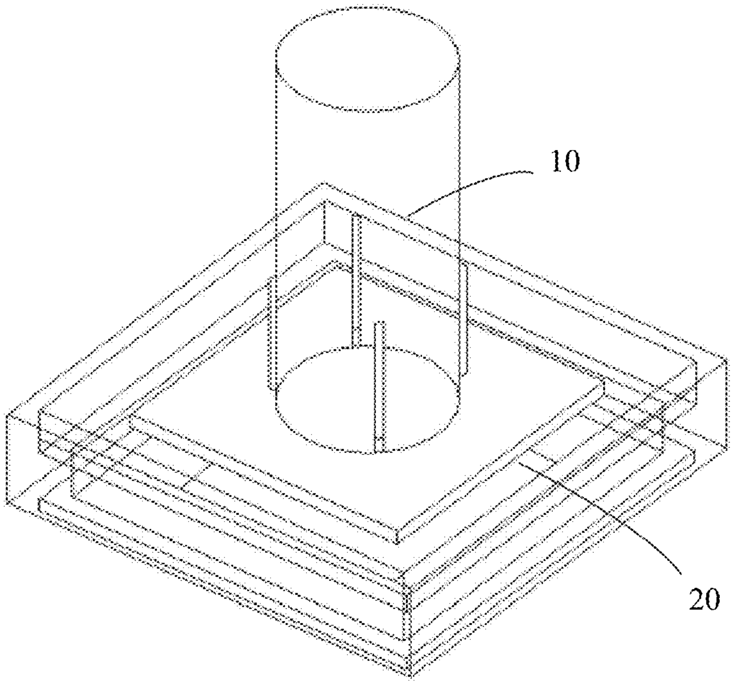
FIG. 2*d* is another diagram of a structure of an antenna assembly according to an embodiment of this application.
Figure 3:
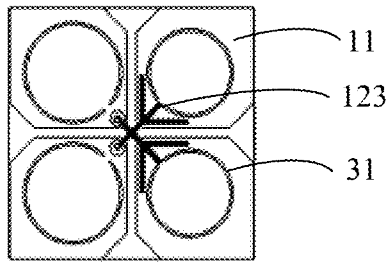
FIG. 3 is a top view of a first antenna array element in an antenna assembly according to an embodiment of this application.

Refer to FIG. 2*a* and FIG. 3. The first filtering structure 30 may include a split-ring resonator structure 31, the dipole antenna may include a first feeding unit 12 and one or more dipole arms 11, the one or more dipole arms 11 are coupled to one feeding unit 12, at least one split-ring resonator structure 31 is disposed on the one or more dipole arms 11, and a slit of the coupled resonator structure 31 faces the axis of the dipole antenna. When the one or more dipole arms 11 are connected only to one feeding unit 12, the dipole antenna is a single-polarized antenna. The split-ring resonator structure 31 may enable the dipole antenna to have high impedance in the non-operating frequency band, and the split-ring resonator structure 31 destroys original impedance matching of the dipole arm 11 of the dipole antenna, to implement a stopband characteristic. In addition, the split-ring resonator structure 31 further has a high quality factor characteristic, and may further implement high selectivity of a stopband frequency band. Therefore, the split-ring coupled resonator 31 may perform filtering in the non-operating frequency band of the dipole antenna, and the quantity of split-ring resonators disposed on the one or more dipole arms 11 may be adjusted based on a filtering requirement of the dipole antenna.

Figure 4:
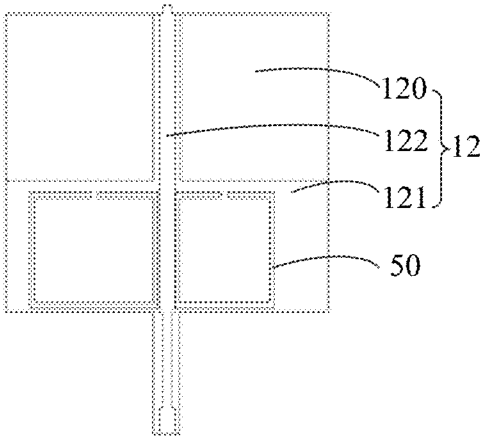
FIG. 4 is a side view of a first antenna array element in an antenna assembly according to an embodiment of this application.

Refer to FIG. 2*a*, FIG. 3, and FIG. 4. The dipole antenna may alternatively include two feeding units 12 and two dipole arms 11, the two dipole arms 11 are on the same plane, and each dipole arm 11 may be coupled to one first feeding unit 12. One or more split-ring resonator structures 31 may be disposed on each dipole arm 11. For example, two split-ring resonator structures 31 may be disposed on each dipole arm 11. In other words, at least two split-ring resonator structures 31 may be disposed on the two dipole arms 11, and a slit of at least one of the at least two split-ring resonator structures 31 faces the axis of the dipole antenna. For example, slits of all the split-ring resonator structures 31 face the axis of the dipole antenna. In this case, the dipole antenna is a dual-polarized antenna, and the split-ring resonator structures 31 on the dipole arms 11 may perform filtering in different non-operating frequency bands or the same non-operating frequency band of the first antenna array element 10. Specifically, the split-ring resonator structures 31 may perform filtering in different non-operating frequency bands of the first antenna array element 10. It may be understood that even if filtering in different non-operating frequency bands are performed, filtering ranges corresponding to the split-ring resonator structures 31 may partially overlap or may not overlap at all.

In the foregoing embodiment, to enable the split-ring resonator structure 31 to have the high quality factor characteristic and implement high selectivity of the stopband frequency band, a wavelength of the split-ring resonator structure 31 may be ¼ wavelength.

In a possible implementation of the foregoing embodiment, the first filtering structure may include a first coupled resonator structure 50 disposed on the first feeding unit 12 of the dipole antenna. The following describes a specific position of the first coupled resonator structure 50 disposed on the first feeding unit 12. The first feeding unit 12 may include a feeding balun 123, a first dielectric plate 120, a feeder 122, and a ground end 121. One end of the first dielectric plate 120 may support the dipole arm 11, so that the position of the dipole arm 11 is fixed. The other end of the first dielectric plate 120 may contact the second antenna array element 20. The feeder 122 and the ground end 121 may be disposed on two opposite surfaces of the first dielectric plate 120, one end of the feeder 122 may be connected to the feeding balun 123, the feeding balun 123 is coupled to the dipole arm 11, and the other end of the feeder 122 may be connected to a power division network. The first coupled resonator structure 50 is disposed on the first dielectric plate 120, the first coupled resonator structure 50 and the feeder 122 may be disposed on the same side of the first dielectric plate 120, and a gap exists between the first coupled resonator structure 50 and the feeder 122. Because the first coupled resonator structure 50 may also enable the non-operating frequency band of the dipole antenna to implement the stopband characteristic, and the first coupled resonator structure 50 is disposed on the first dielectric plate 120, the non-operating frequency band of the dipole antenna can also be filtered. The first coupled resonator structure 50 and the split-ring resonator structure 31 may filter different frequency bands or the same frequency band. In this way, the first filtering structure may filter different frequency bands or the same non-operating frequency band of the first antenna array element 10 by using the first coupled resonator structure 50 and/or the split-ring resonator structure 31. When the first coupled resonator structure 50 and the split-ring resonator structure 31 filter the same frequency band, an effect of filtering the frequency band by the first filtering structure can be better. When the first coupled resonator structure 50 and the split-ring resonator 31 filter different frequency bands, the first filtering structure can perform filtering in more non-operating frequency bands.

It should be noted that, a plurality of first coupled resonator structures 50 may alternatively be disposed on the first dielectric plate 120, and different first coupled resonator structures 50 may perform filtering in different non-operating frequency bands or the same non-operating frequency band of the dipole antenna. To implement a better filtering effect of the first coupled resonator structure 50, a cross section of the first coupled resonator structure 50 may be a rectangle, and a slit of the first coupled resonant structure 50 may be provided on any side wall of the rectangle.

Figure 5:
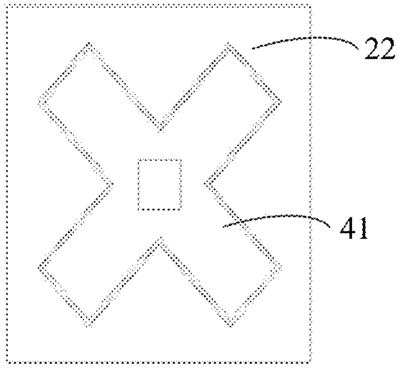
FIG. 5 is a top view of a second antenna array element in an antenna assembly according to an embodiment of this application.
Figure 6:
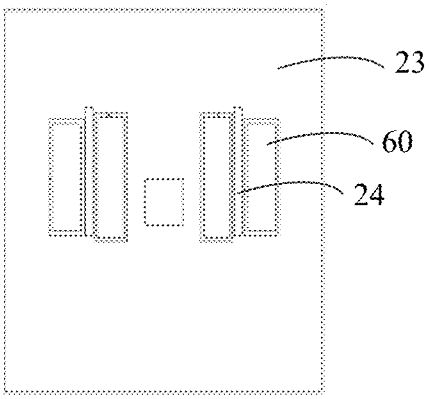
FIG. 6 is a bottom view of a second antenna array element in an antenna assembly according to an embodiment of this application.

Refer to FIG. 2*a*, FIG. 5, and FIG. 6. The patch antenna may include an antenna body 21, a parasitic patch 22, and a second feeding unit 24. The second feeding unit 24 may be connected to the antenna body 21 and a power division network. It may be understood that the connections in this application are all electrical connections, in other words, signal transmission exists. The connection may be a direct connection or an indirect connection via another component element. This is not limited herein. The parasitic patch 22 may be disposed between the antenna body 21 and the dipole arm 11 (the dipole antenna), and a gap may exist between the parasitic patch 22 and the antenna body 21, to increase a bandwidth of the patch antenna. In addition, the second filtering structure may include a short-circuit cavity 41. The short-circuit cavity 41 may be disposed on a side that is of the parasitic patch 22 and that is away from the dipole antenna (a side of the dipole arm 11). The short-circuit cavity 41 may perform filtering in the non-operating frequency band of the patch antenna, to avoid crosstalk with the first antenna array element caused by a signal in the non-operating frequency band of the patch antenna.

When the parasitic patch 22 and the antenna body 21 are specifically disposed, to enable the patch antenna 21 and the dipole antenna to be co-grounded, and ensure that the first filtering structure and the second filtering structure can perform filtering in the patch antenna and the dipole antenna, holes may be provided on the parasitic patch 22 and the antenna body 21. The holes may facilitate an electrical connection between the ground end 121 of the first feeding unit 12 in the first antenna array element 10 and a ground end of the second feeding unit 24.

It should be noted that, when an opening is provided on the parasitic patch 22, a shape of the opening may be a square. The square hole may be provided without destroying a current in a direction of ±45° on the patch antenna, to avoid deterioration of cross polarization ratio in directivity patterns. To improve a filtering effect of the short-circuit cavity 41, the short-circuit cavity 41 may be a ½ wavelength cross-shaped structure.

In a possible embodiment of the foregoing embodiment, the filtering structure may include a second coupled resonator structure 60. The second coupled resonator structure 60 may be disposed on a second dielectric plate 23 of the second antenna array element 20. The second coupled resonator structure 60 is coupled to the second feeding unit 24. The second coupled resonator structure 60 may also perform filtering in the non-operating frequency band of the patch antenna, to improve an effect of filtering the non-operating frequency band of the second antenna array element by the filtering structure.

It should be noted that, a plurality of second coupled resonator structures 60 may alternatively be disposed, the second coupled resonator structures 60 may be disposed on two sides of a feeder of each second feeding unit 24, and a gap exists between the second coupled resonator structure 60 and the feeder of the second feeding unit 24. In addition, in this manner, the second filtering structure may filter different frequency bands or the same non-operating frequency band of the second antenna array element 20 by using the short-circuit cavity 41 and/or the second coupled resonator structure 60. When the second coupled resonator structure 60 and the short-circuit cavity 41 filter the same frequency band, an effect of filtering the frequency band by the second filtering structure can be better. When the second coupled resonator structure 60 and the short-circuit cavity 41 filter different frequency bands, the second filtering structure can perform filtering in more non-operating frequency bands.

In the foregoing embodiment, when the antenna assembly is specifically disposed on the metal floor, the second dielectric plate 23 of the second antenna array element is disposed on a side that is of the metal floor and that is away from the dipole antenna, both the parasitic patch 22 and the antenna body 21 in the second antenna array element are disposed on a side that is of the metal floor and that faces the dipole antenna, and an opening corresponding to openings on the parasitic patch 22 and the antenna body 21 also need to be provided on the metal floor, so that the feeder of the dipole antenna can pass through the metal floor and be connected to the power division network.

The antenna assembly may further include a baffle plate 70. The baffle plate 70 may be located between the patch antenna and the dipole antenna. Specifically, the baffle plate 70 and the parasitic patch 22 may be disposed in a stacked manner, to be specific, the baffle plate 70 may be disposed on a side that is of the parasitic patch 22 and that faces the dipole arm 11. The baffle plate 70 may improve the problem of distortion in directivity patterns of the antenna assembly.

Figure 7:
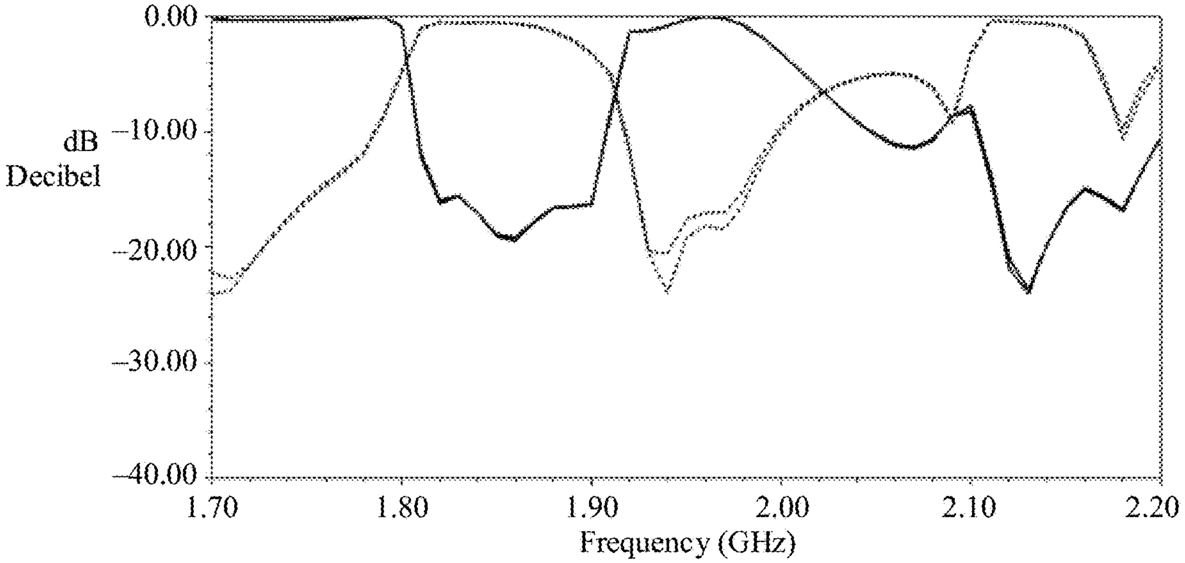
FIG. 7 is a diagram of a matching simulation result of an antenna assembly according to an embodiment of this application.

To further describe an effect of the antenna assembly, in FIG. 7, a dashed line shows the first antenna array element, and a solid line shows the second antenna array element. Refer to FIG. 7. It can be learned that when the first antenna array element of the antenna assembly is in operating frequency bands of 1.71 GHz to 1.785 GHz and 1.92 GHz to 1.98 GHZ, and a reflection coefficient is less than −10 dB (decibels). When the first antenna array element is in non-operating frequency bands of 1.805 GHz to 1.88 GHz and 2.11 GHz to 2.17 GHz, because the filtering structure is used, a reflection coefficient is greater than −1 dB. When the second antenna array element is in operating frequency bands of 1.805 GHz to 1.88 GHz and 2.11 GHz to 2.17 GHz, a reflection coefficient is less than −10 dB. When the second antenna array element is in non-operating frequency bands of 1.71 GHZ to 1.785 GHz and 1.92 GHz to 1.98 GHz, a reflection coefficient is greater than −2 dB.

Figure 8:
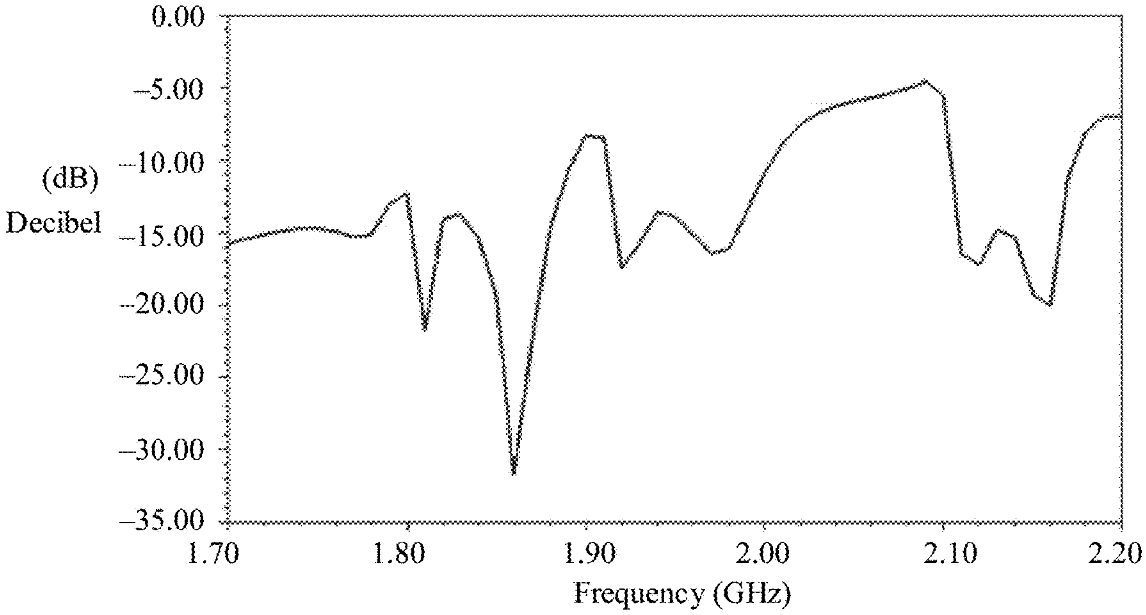
FIG. 8 is a diagram of an isolation simulation result of an antenna assembly according to an embodiment of this application.

Refer to FIG. 8. A result of isolation of the antenna assembly can be obtained. It can be seen that isolation of the antenna assembly in receiving frequency bands, namely, the operating frequency bands of 1.71 GHz to 1.785 GHz and 1.92 GHz to 1.98 GHz is less than −14 dB, isolation of the antenna assembly in transmitting frequency bands, namely, the operating frequency bands of 1.805 GHz to 1.88 GHz and 2.11 GHz to 2.17 GHz is less than −14 dB, and isolation of the antenna assembly on the entire non-operating frequency band (2 GHz to 2.1 GHZ) is less than −5 dB. This indicates that use of the filtering structure may increase the isolation by about 10 dB.

Figure 9A:
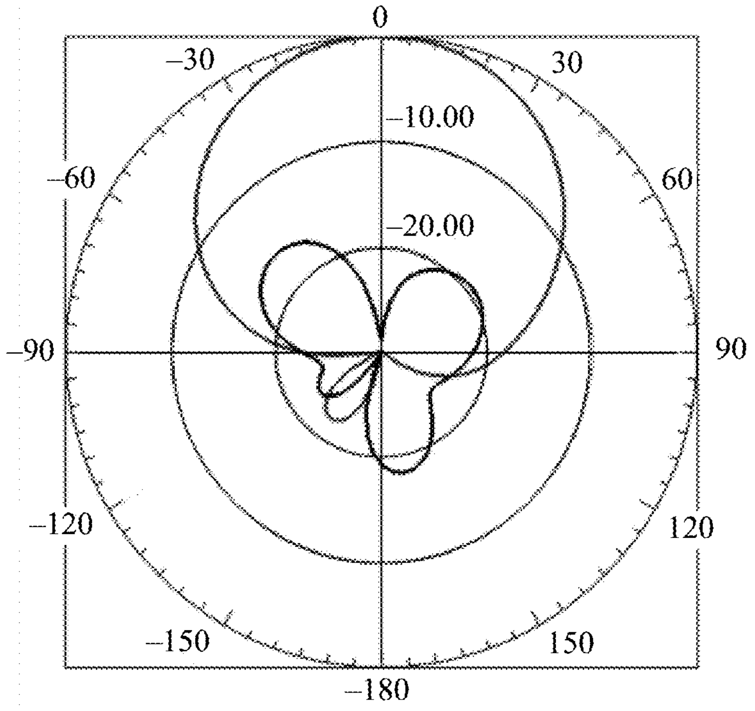
FIG. 9*a* is a directivity pattern simulation diagram of a first antenna array element of an antenna assembly in a 1.74 GHz operating frequency band.
Figure 9B:
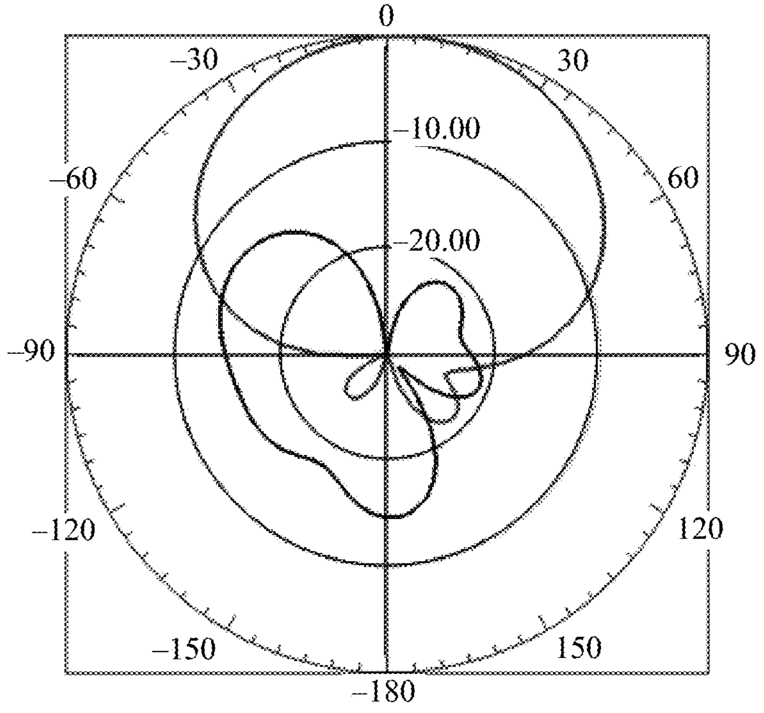
FIG. 9*b* is a directivity pattern simulation diagram of a second antenna array element of an antenna assembly in a 1.84 GHz operating frequency band.

FIG. 9*a* is a directivity pattern simulation diagram of the first antenna array element of the antenna assembly at a 1.74 GHz operating frequency (corresponding to an approximate middle frequency of 1.71 GHz to 1.785 GHz). FIG. 9*b* is a directivity pattern simulation diagram of the second antenna array element of the antenna assembly at a 1.84 GHz operating frequency (corresponding to an approximate middle frequency of 1.805 GHz to 1.88 GHZ). Refer to FIG. 9*a* and FIG. 9*b*. It can be obtained that the transmitting antenna and the receiving antenna are coaxially disposed, and a good radiation pattern of the antenna is still kept without distortion.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna assembly, comprising:

a first antenna array element configured to receive in a first frequency band;

a second antenna array element configured to transmit in a second frequency band; and a filtering structure comprising at least one of a first filtering structure or a second filtering structure, wherein the first filtering structure is disposed on the first antenna array element, or the second filtering structure is disposed on the second antenna array element;

wherein the second filtering structure comprises a short-circuit cavity, the second antenna array element is a patch antenna, and the patch antenna comprises an antenna body, a parasitic patch, and a second feeding unit; and one end of the second feeding unit is connected to the antenna body, an other end of the second feeding unit is connected to a power division network, the parasitic patch is located between the antenna body and a dipole antenna, and a gap exists between the parasitic patch and the antenna body, wherein the short-circuit cavity is disposed on a side of the parasitic patch away from the dipole antenna, and holes are provided on the parasitic patch and the antenna body, and a ground end of the first feeding unit in the first antenna array element is electrically connected to a ground end of the second feeding unit.

2. The antenna assembly according to claim 1, wherein the first antenna array element supports transmitting in a third frequency band.

3. The antenna assembly according to claim 1, wherein the first antenna array element and the second antenna array element are coaxially disposed.

4. The antenna assembly according to claim 1, wherein a coverage area of the first antenna array element and a coverage area of the second antenna array element partially or completely overlap, and a gap exists between an axis of the first antenna array element and an axis of the second antenna array element.

5. The antenna assembly according to claim 1, wherein the first antenna array element is a dipole antenna, a dielectric resonator antenna, or a patch antenna.

6. The antenna assembly according to claim 5, wherein the first filtering structure comprises a split-ring resonator structure, the first antenna array element is the dipole antenna, the dipole antenna comprises a first feeding unit and one or more dipole arms coupled to the first feeding unit, and at least one split-ring resonator structure is disposed on at least one of the one or more dipole arms.

7. The antenna assembly according to claim 6, wherein the dipole antenna comprises two dipole arms located on a same plane, one first feeding unit is coupled to each dipole arm, two split-ring resonator structures are disposed on each dipole arm, and a slit of each split-ring resonator structure faces an axis of the dipole antenna.

8. The antenna assembly according to claim 5, wherein the first filtering structure comprises a first coupled resonator structure disposed on the first feeding unit of the dipole antenna.

9. The antenna assembly according to claim 8, wherein the first feeding unit comprises a feeding balun, a feeder, a ground end, and a first dielectric plate configured to support the dipole arm, the feeder is disposed on the first dielectric plate, one end of the feeder is connected to the feeding balun, the feeding balun is coupled to the dipole arm, an other end of the feeder is connected to a power division network, the feeder and the first coupled resonator structure are disposed on one surface of the first dielectric plate, the ground end is disposed on an other surface of the first dielectric plate, and a gap exists between the first coupled resonator structure and the feeder.

10. The antenna assembly according to claim 5, further comprising a baffle plate, and the baffle plate is disposed between the patch antenna and the dipole antenna.

11. The antenna assembly according to claim 1, wherein the short-circuit cavity comprises a cross-shape.

12. The antenna assembly according to claim 1, wherein the patch antenna further comprises a second dielectric plate, the second filtering structure comprises a second coupled resonator structure, the second dielectric plate is disposed on a side of the antenna body away from the parasitic patch, both the second feeding unit and the second coupled resonator structure are disposed on the second dielectric plate, the second coupled resonator structure is coupled to the second feeding unit, and a gap exists between the second coupled resonator structure and the second feeding unit.

13. The antenna assembly according to claim 1, wherein the antenna assembly is distributed on a metal floor in an array.

14. The antenna assembly according to claim 1, wherein a gap exists between the antenna assembly and an adjacent antenna assembly in a row direction.

15. An antenna assembly, comprising:

a dipole antenna configured to receive in a first frequency band;

a patch antenna configured to transmit in a second frequency band;

a baffle plate disposed between the dipole antenna and the patch antenna; and a filter comprising at least one of a first filtering component or a second filtering component, the first filtering component is disposed on the dipole antenna, and the second filtering component comprises a short circuit cavity and is disposed on the patch antenna.

16. The antenna assembly of claim 15, wherein the first filtering component comprises a first coupled resonator structure or a split-ring resonator structure.

17. The antenna assembly of claim 15, wherein the dipole antenna comprises two dipole arms located on a same plane, one first feeding unit is coupled to each dipole arm, two split-ring resonator structures are disposed on each dipole arm, and a slit of each split-ring resonator structure faces an axis of the dipole antenna.

18. The antenna assembly of claim 15, wherein the patch antenna comprises an antenna body, a parasitic patch, and a second feeding unit.

19. The antenna assembly according to claim 15, wherein the short-circuit cavity comprises a cross-shape.

20. The antenna assembly according to claim 15, wherein the dipole antenna and the patch antenna are coaxially disposed.

* * * * *